US010579688B2

(12) United States Patent
Green

(10) Patent No.: US 10,579,688 B2
(45) Date of Patent: Mar. 3, 2020

(54) SEARCH RANKING AND RECOMMENDATIONS FOR ONLINE SOCIAL NETWORKS BASED ON RECONSTRUCTED EMBEDDINGS

(71) Applicant: Facebook, Inc., Menlo Park, CA (US)

(72) Inventor: Bradley Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 705 days.

(21) Appl. No.: 15/286,315

(22) Filed: Oct. 5, 2016

(65) Prior Publication Data

US 2018/0096071 A1   Apr. 5, 2018

(51) Int. Cl.
| | | |
|---|---|---|
| *G06F 17/30* | (2006.01) | |
| *G06F 7/00* | (2006.01) | |
| *G06F 16/9535* | (2019.01) | |
| *G06F 16/248* | (2019.01) | |
| *G06F 16/2457* | (2019.01) | |
| *G06Q 50/00* | (2012.01) | |
| *G06Q 30/02* | (2012.01) | |
| *G06Q 10/10* | (2012.01) | |

(52) U.S. Cl.
CPC ........ *G06F 16/9535* (2019.01); *G06F 16/248* (2019.01); *G06F 16/24578* (2019.01); *G06Q 10/10* (2013.01); *G06Q 30/0251* (2013.01); *G06Q 50/01* (2013.01)

(58) Field of Classification Search
CPC ........... G06F 16/9535; G06F 16/24578; G06F 16/248
USPC ........................................................ 707/728
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |

(Continued)

OTHER PUBLICATIONS

U.S. Appl. No. 14/949,436, filed Nov. 23, 2015, Weston.

(Continued)

*Primary Examiner* — Pavan Mamillapalli
(74) *Attorney, Agent, or Firm* — Baker Botts L.L.P.

(57) ABSTRACT

In one embodiment, a method includes receiving a query inputted by a user; identifying one or more objects matching the query; generating a reconstructed embedding of the query based on one or more term embeddings associated with one or more of the n-grams of the query, respectively; calculating, for each identified object, a relevance-score based on a similarity metric of the reconstructed embedding of the query and an object embedding associated with the identified object; generating one or more search results based on the calculated relevance-scores, each search result corresponding to one of the identified objects; and sending a search-results interface for display, the search-results interface comprising one or more of the search results, each search result comprising a reference to its corresponding identified object.

19 Claims, 11 Drawing Sheets

(56) References Cited

U.S. PATENT DOCUMENTS

| | | | |
|---|---|---|---|
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,209,330 B1 | 6/2012 | Covell | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,306,922 B1 | 11/2012 | Kunal | |
| 8,312,056 B1 | 11/2012 | Peng | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,442,977 B2 * | 5/2013 | McCloskey | G06F 16/7328 |
| | | | 707/728 |
| 8,538,960 B2 | 9/2013 | Wong | |
| 8,572,129 B1 | 10/2013 | Lee | |
| 8,578,274 B2 | 11/2013 | Druzgalski | |
| 8,595,297 B2 | 11/2013 | Marcucci | |
| 8,601,027 B2 | 12/2013 | Behforooz | |
| 8,606,721 B1 | 12/2013 | Dicker | |
| 8,639,725 B1 | 1/2014 | Udeshi | |
| 8,732,208 B2 | 5/2014 | Lee | |
| 8,751,521 B2 | 6/2014 | Lee | |
| 8,775,324 B2 | 7/2014 | Zhu | |
| 8,782,080 B2 | 7/2014 | Lee | |
| 8,782,753 B2 | 7/2014 | Lunt | |
| 8,832,111 B2 | 9/2014 | Venkataramani | |
| 8,868,590 B1 | 10/2014 | Donneau-Golencer | |
| 8,868,603 B2 | 10/2014 | Lee | |
| 8,898,226 B2 | 11/2014 | Tiu | |
| 8,909,637 B2 | 12/2014 | Patterson | |
| 8,914,392 B2 | 12/2014 | Lunt | |
| 8,918,418 B2 | 12/2014 | Lee | |
| 8,924,406 B2 | 12/2014 | Lunt | |
| 8,935,255 B2 | 1/2015 | Sankar | |
| 8,935,261 B2 | 1/2015 | Pipegrass | |
| 8,935,271 B2 | 1/2015 | Lassen | |
| 8,949,232 B2 | 2/2015 | Harrington | |
| 8,949,250 B1 | 2/2015 | Garg | |
| 8,949,261 B2 | 2/2015 | Lunt | |
| 8,954,675 B2 | 2/2015 | Venkataramani | |
| 8,983,991 B2 | 3/2015 | Sankar | |
| 2002/0059199 A1 | 5/2002 | Harvey | |
| 2002/0086676 A1 | 7/2002 | Hendrey | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0172237 A1 | 9/2004 | Saldanha | |
| 2004/0215793 A1 | 10/2004 | Ryan | |
| 2004/0243568 A1 | 12/2004 | Wang | |
| 2004/0255237 A1 | 12/2004 | Tong | |
| 2005/0091202 A1 | 4/2005 | Thomas | |
| 2005/0125408 A1 | 6/2005 | Somaroo | |
| 2005/0131872 A1 | 6/2005 | Calbucci | |
| 2005/0171955 A1 | 8/2005 | Hull | |
| 2005/0256756 A1 | 11/2005 | Lam | |
| 2006/0041597 A1 | 2/2006 | Conrad | |
| 2006/0117378 A1 | 6/2006 | Tam | |
| 2006/0136419 A1 | 6/2006 | Brydon | |
| 2006/0190436 A1 | 8/2006 | Richardson | |
| 2007/0174304 A1 | 7/2007 | Shrufi | |
| 2007/0217676 A1 * | 9/2007 | Grauman | G06K 9/4671 |
| | | | 382/170 |
| 2007/0277100 A1 | 11/2007 | Sheha | |
| 2008/0005064 A1 | 1/2008 | Sarukkai | |
| 2008/0033926 A1 | 2/2008 | Matthews | |
| 2008/0072180 A1 | 3/2008 | Chevalier | |
| 2008/0114730 A1 | 5/2008 | Larimore | |
| 2008/0183694 A1 | 7/2008 | Cane | |
| 2008/0183695 A1 | 7/2008 | Jadhav | |
| 2008/0270615 A1 | 10/2008 | Centola | |
| 2009/0006543 A1 | 1/2009 | Smit | |
| 2009/0054043 A1 | 2/2009 | Hamilton | |
| 2009/0094200 A1 | 4/2009 | Baeza-Yates | |
| 2009/0164408 A1 | 6/2009 | Grigorik | |
| 2009/0164431 A1 | 6/2009 | Zivkovic | |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0259624 A1 | 10/2009 | DeMaris | |
| 2009/0259646 A1 | 10/2009 | Fujita | |
| 2009/0265326 A1 | 10/2009 | Lehrman | |
| 2009/0271370 A1 | 10/2009 | Jagadish | |
| 2009/0276414 A1 | 11/2009 | Gao | |
| 2009/0281988 A1 | 11/2009 | Yoo | |
| 2009/0299963 A1 | 12/2009 | Pippori | |
| 2010/0049802 A1 | 2/2010 | Raman | |
| 2010/0057723 A1 | 3/2010 | Rajaram | |
| 2010/0082695 A1 | 4/2010 | Hardt | |
| 2010/0125562 A1 | 5/2010 | Nair | |
| 2010/0145771 A1 | 6/2010 | Fligler | |
| 2010/0179929 A1 | 7/2010 | Yin | |
| 2010/0197318 A1 | 8/2010 | Petersen | |
| 2010/0228744 A1 | 9/2010 | Craswell | |
| 2010/0235354 A1 | 9/2010 | Gargaro | |
| 2010/0321399 A1 | 12/2010 | Ellren | |
| 2011/0004609 A1 | 1/2011 | Chitiveli | |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1 | 6/2011 | Wable | |
| 2011/0184981 A1 | 7/2011 | Lu | |
| 2011/0191371 A1 | 8/2011 | Elliott | |
| 2011/0196855 A1 | 8/2011 | Wable | |
| 2011/0231296 A1 | 9/2011 | Gross | |
| 2011/0276396 A1 | 11/2011 | Rathod | |
| 2011/0313992 A1 | 12/2011 | Groeneveld | |
| 2011/0320470 A1 | 12/2011 | Williams | |
| 2012/0042020 A1 | 2/2012 | Kolari | |
| 2012/0047147 A1 | 2/2012 | Redstone | |
| 2012/0059708 A1 | 3/2012 | Galas | |
| 2012/0109858 A1 * | 5/2012 | Makadia | G06F 16/435 |
| | | | 706/12 |
| 2012/0110080 A1 | 5/2012 | Panyam | |
| 2012/0136852 A1 | 5/2012 | Geller | |
| 2012/0166432 A1 | 6/2012 | Tseng | |
| 2012/0166433 A1 | 6/2012 | Tseng | |
| 2012/0179637 A1 | 7/2012 | Juan | |
| 2012/0185472 A1 | 7/2012 | Ahmed | |
| 2012/0185486 A1 | 7/2012 | Voigt | |
| 2012/0209832 A1 | 8/2012 | Neystadt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | Van Den Oord | |
| 2012/0290950 A1 | 11/2012 | Rapaport | |
| 2012/0296776 A1 * | 11/2012 | Kalai | G06Q 30/0633 |
| | | | 705/26.63 |
| 2012/0296900 A1 * | 11/2012 | Kalai | G06F 16/9535 |
| | | | 707/737 |
| 2012/0310922 A1 | 12/2012 | Johnson | |
| 2012/0311034 A1 | 12/2012 | Goldband | |
| 2012/0317088 A1 | 12/2012 | Pantel | |
| 2012/0331063 A1 | 12/2012 | Rajaram | |
| 2013/0031106 A1 | 1/2013 | Schechter | |
| 2013/0031113 A1 | 1/2013 | Feng | |
| 2013/0041876 A1 | 2/2013 | Dow | |
| 2013/0066876 A1 | 3/2013 | Raskino | |
| 2013/0073400 A1 | 3/2013 | Heath | |
| 2013/0085970 A1 | 4/2013 | Karnik | |
| 2013/0086024 A1 | 4/2013 | Liu | |
| 2013/0086057 A1 | 4/2013 | Harrington | |
| 2013/0097140 A1 | 4/2013 | Scheel | |

(56) References Cited

U.S. PATENT DOCUMENTS

| | | | |
|---|---|---|---|
| 2013/0124538 A1 | 5/2013 | Lee | |
| 2013/0124542 A1 | 5/2013 | Lee | |
| 2013/0144899 A1 | 6/2013 | Lee | |
| 2013/0191372 A1 | 7/2013 | Lee | |
| 2013/0191416 A1 | 7/2013 | Lee | |
| 2013/0198219 A1 | 8/2013 | Cohen | |
| 2013/0204737 A1 | 8/2013 | Agarwal | |
| 2013/0226918 A1 | 8/2013 | Berkhim | |
| 2013/0227011 A1 | 8/2013 | Sharma | |
| 2013/0246404 A1 | 9/2013 | Annau | |
| 2013/0254155 A1 | 9/2013 | Thollot | |
| 2013/0254305 A1 | 9/2013 | Cheng | |
| 2013/0336588 A1* | 12/2013 | Rane | G06K 9/6239 382/197 |
| 2014/0006416 A1 | 1/2014 | Leslie | |
| 2014/0067535 A1 | 3/2014 | Rezaei | |
| 2014/0122465 A1 | 5/2014 | Bilinski | |
| 2014/0280080 A1 | 9/2014 | Solheim | |
| 2014/0298220 A1* | 10/2014 | Luu | G06F 3/04883 715/765 |
| 2014/0304429 A1 | 10/2014 | Softky | |
| 2015/0074289 A1 | 3/2015 | Hyman | |
| 2015/0161519 A1 | 6/2015 | Zhong | |
| 2015/0186742 A1* | 7/2015 | Murray | G06K 9/4676 382/190 |
| 2015/0286643 A1 | 10/2015 | Kumar | |
| 2015/0363402 A1 | 12/2015 | Jackson | |
| 2016/0026727 A1 | 1/2016 | Bar-Yossef | |
| 2016/0041982 A1 | 2/2016 | He | |
| 2016/0042067 A1 | 2/2016 | Weng | |
| 2016/0063093 A1 | 3/2016 | Boucher | |
| 2016/0063115 A1 | 3/2016 | Ayan | |
| 2016/0162502 A1 | 6/2016 | Zhou | |
| 2016/0203238 A1 | 7/2016 | Cherniavskii | |
| 2017/0206435 A1* | 7/2017 | Jin | G06K 9/628 |
| 2017/0206465 A1* | 7/2017 | Jin | G06F 16/5866 |

OTHER PUBLICATIONS

U.S. Appl. No. 14/952,707, filed Nov. 23, 2015, Evnine.
U.S. Appl. No. 14/984,956, filed Dec. 30, 2015, Weston.
U.S. Appl. No. 14/981,413, filed Dec. 28, 2015, Paluri.
U.S. Appl. No. 15/260,214, filed Sep. 8, 2016, Gupta.

* cited by examiner

SEARCH RANKING AND RECOMMENDATIONS FOR ONLINE SOCIAL NETWORKS BASED ON RECONSTRUCTED EMBEDDINGS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may use reconstructed embeddings to provide relevant search results. A reconstructed embedding of a query may be based on the embeddings of the n-grams of the query. A relevance-score may be calculated for an object based on a similarity metric of the reconstructed embedding of the query and an embedding of the object. A reconstructed embedding of a user may be based on embeddings for objects the user has interacted with. A personalization-score may be calculated for an object based on a similarity metric of the reconstructed embedding of the user and an embedding of the object. A reconstructed embedding of a search context for a search session of a user may be based on the reconstructed embedding of the user and the reconstructed embedding of the query. If the user updates the query, the reconstructed embedding search context may be updated based on the reconstructed embedding of the updated query. If the user interacts with a search result, the reconstructed embedding search context may be updated based on the embedding of the object corresponding to the search result. A context-score may be calculated for an object based on a similarity metric of the reconstructed embedding of the search context and an embedding of the object.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
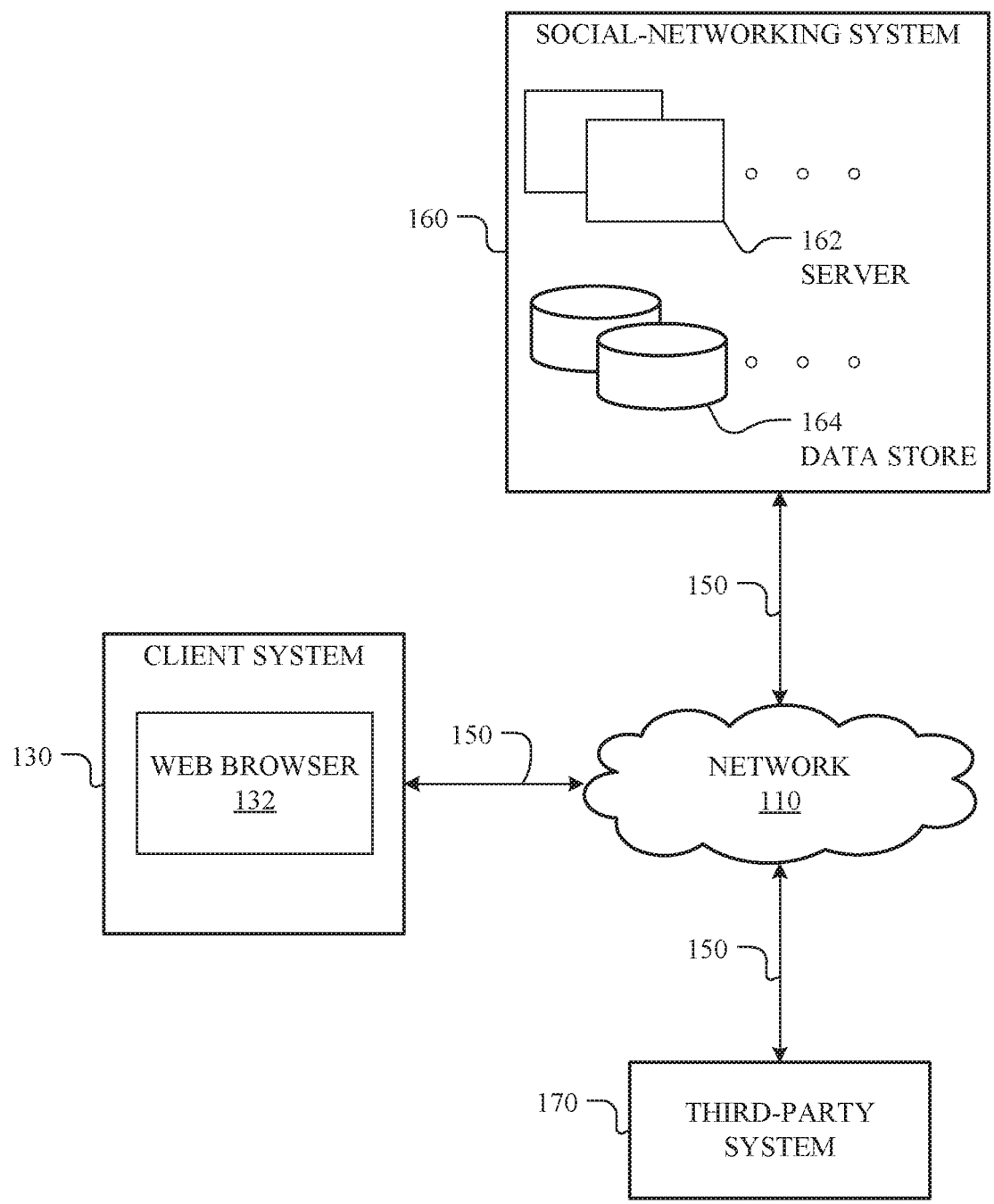
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host a communications network (e.g., an online social network, a messaging system, etc.). The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
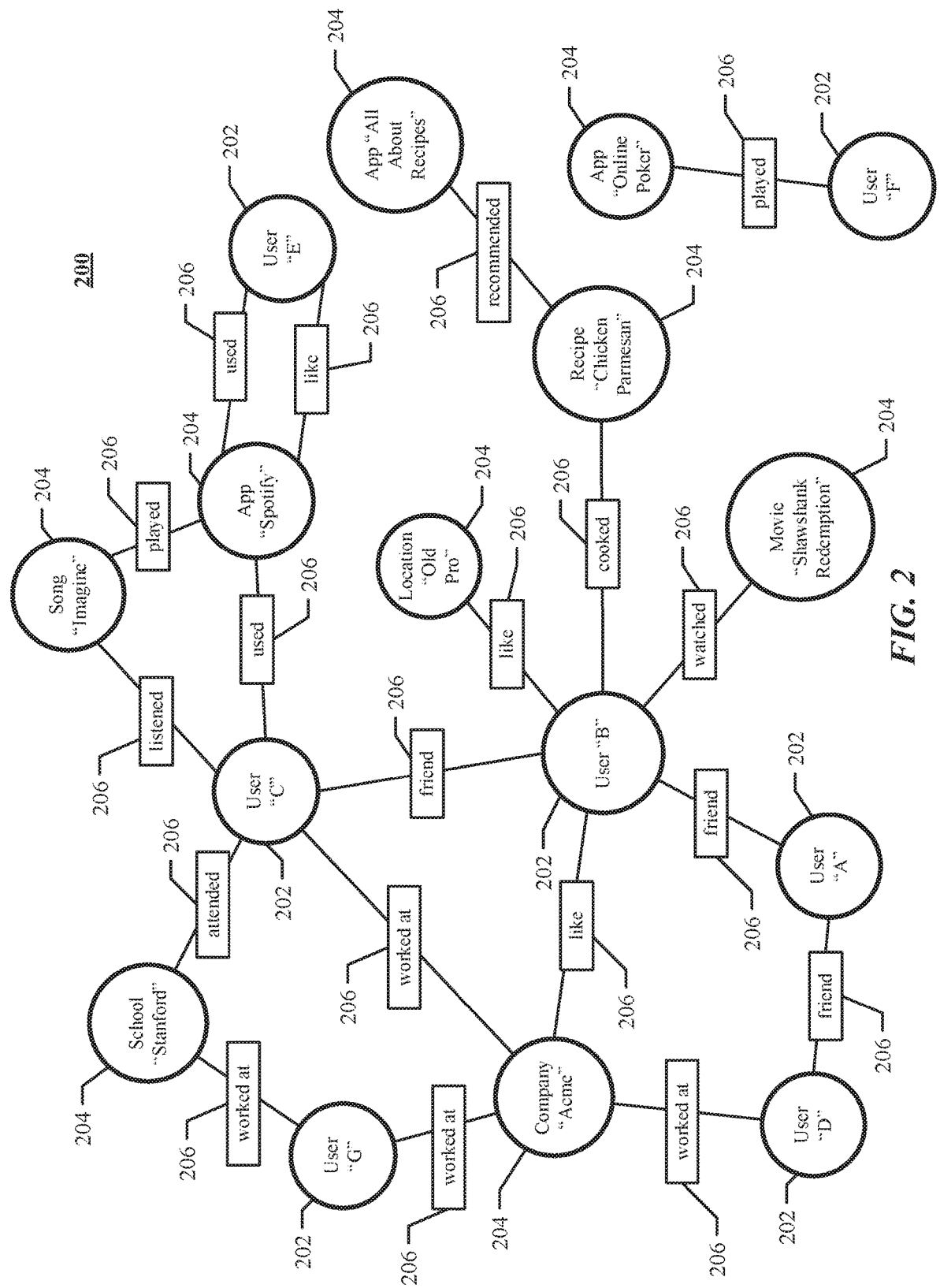
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system 130 of a user of a communications network, a query inputted by the user, wherein the query may comprise one or more n-grams. As used herein, n-grams may be words or groups of words, any part of speech, punctuation marks (e.g., "!"), colloquialisms (e.g., "go nuts"), acronyms (e.g., "BRB"), abbreviations (e.g., "mgmt."), exclamations ("ugh"), alphanumeric characters, symbols, written characters, accent marks, or any combination thereof. In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. In particular embodiments, the social-networking system 160 may identify one or more objects matching the query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan,"

then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
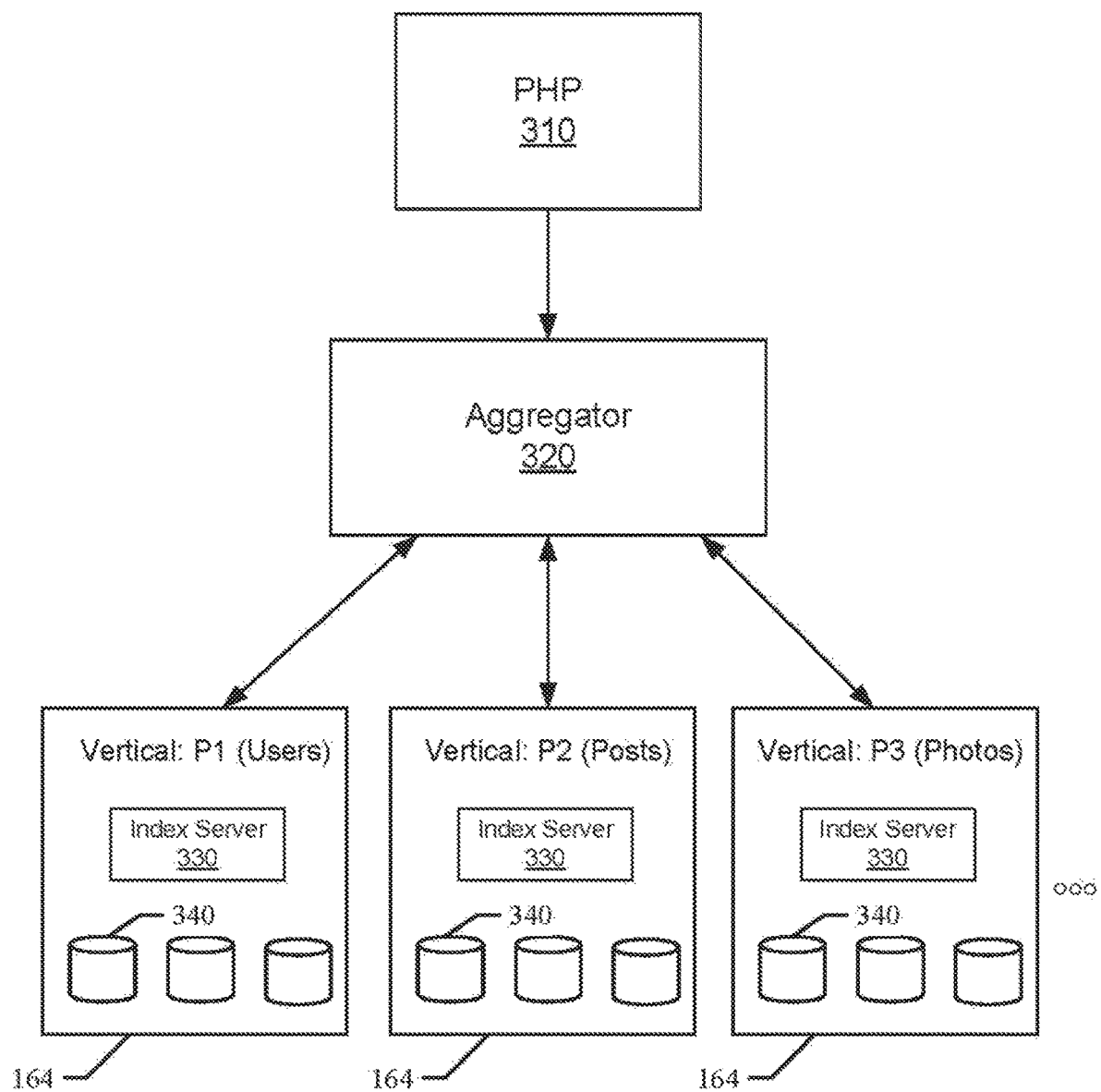
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database may be partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs)

hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Embedding Spaces

Figure 4:
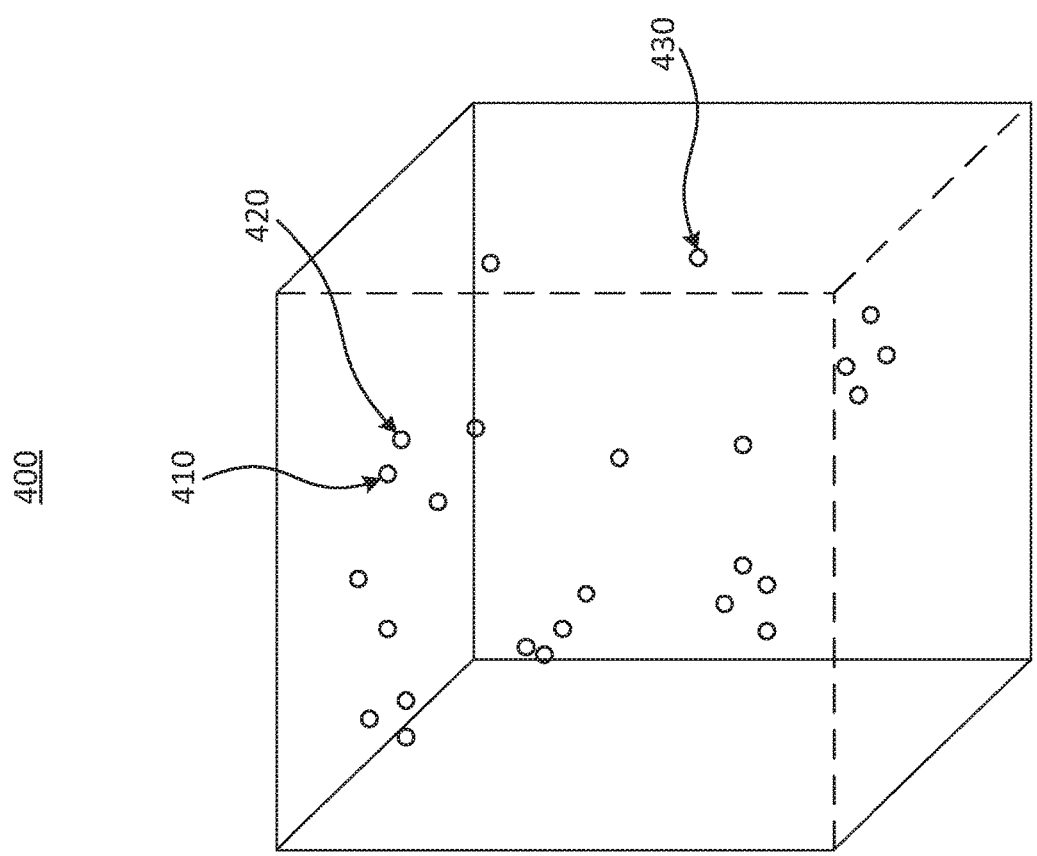
FIG. 4 illustrates an example view of an embedding space.

FIG. 4 illustrates an example view of an embedding space 400. In particular embodiments, n-grams may be represented in a d-dimensional embedding space, where d denotes any suitable number of dimensions. Although the embedding space 400 is illustrated as a three-dimensional space, this is for illustrative purposes only, as the embedding space 400 may be of any suitable dimension. In particular embodiments, an n-gram may be represented in the embedding space 400 as a vector referred to as a term embedding. Each vector may comprise coordinates corresponding to a particular point in the embedding space 400 (i.e., the terminal point of the vector). As an example and not by way of limitation, embeddings 410, 420, and 430 may be represented as points in the embedding space 400, as illustrated in FIG. 4. An n-gram may be mapped to a respective vector representation. As an example and not by way of limitation, n-grams $t_1$ and $t_2$ may be mapped to vectors $\vec{v_1}$ and $\vec{v_2}$ in the embedding space 400, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the embedding space 400. In particular embodiments, an n-gram may be mapped to a vector representation in the embedding space 400 by using a deep-leaning model (e.g., a neural network). The deep-learning model may have been trained using a sequence of training data (e.g., a corpus of objects each comprising n-grams). In particular embodiments, objects may be mapped to an embedding in the embedding space 400. An embedding $\vec{\pi}(e)$ of object e may be based on one or more properties, attributes, or features of the object, relationships of the object with other objects, or any other suitable information associated with the object. As an example and not by way of limitation, an embedding $\vec{\pi}(e)$ of object e may be based on one or more n-grams associated with object e. In particular embodiments, an object may be mapped to a vector representation in the embedding space 400 by using a deep-learning model. In particular embodiments, the social-networking system 160 may utilize one or more systems, components, elements, functions, methods, operations, or steps disclosed in U.S. patent application Ser. No. 14/949,436, filed 23 Nov. 2015, which is incorporated by reference. Although this disclosure describes representing an n-gram or an object in an embedding space in a particular manner, this disclosure contemplates representing an n-gram or an object in an embedding space in any suitable manner.

In particular embodiments, the social-networking system 160 may calculate a similarity metric of embeddings in embedding space 400. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two embeddings may represent how similar the two objects corresponding to the two embeddings, respectively, are to one another, as measured by the distance between the two embeddings in the embedding space 400. As an example and not by way of limitation, embedding 410 and embedding 420 may correspond to objects that are more similar to one another than the objects corresponding to embedding 410 and embedding 430, based on the distance between the respective embeddings.

Search Rankings and Recommendations Based on Reconstructed Embeddings

In particular embodiments, the social-networking system 160 may use reconstructed embeddings to provide relevant search results. An embedding of an object may be a vector representation of the object in an embedding space. Generating a reconstructed embedding for a particular object may be based on embeddings for objects associated with the particular object. A reconstructed embedding of a query may be based on the embeddings of the n-grams of the query. A relevance-score may be calculated for an object based on a similarity metric of the reconstructed embedding of the query and an embedding of the object. A reconstructed embedding of a user may be based on embeddings for objects the user has interacted with. A personalization-score may be calculated for an object based on a similarity metric of the reconstructed embedding of the user and an embedding of the object. A reconstructed embedding of a search context for a search session of a user may be based on the reconstructed embedding of the user and the reconstructed embedding of the query. If the user updates the query, the reconstructed embedding search context may be updated based on the reconstructed embedding of the updated query. If the user interacts with a search result, the reconstructed embedding search context may be updated based on the embedding of the object corresponding to the search result. A context-score may be calculated for an object based on a similarity metric of the reconstructed embedding of the search context and an embedding of the object. Although this disclosure describes using reconstructed embeddings in particular search contexts in a particular manner, this disclosure contemplates using reconstructed embeddings in any suitable search contexts in any suitable manner.

Figure 5:
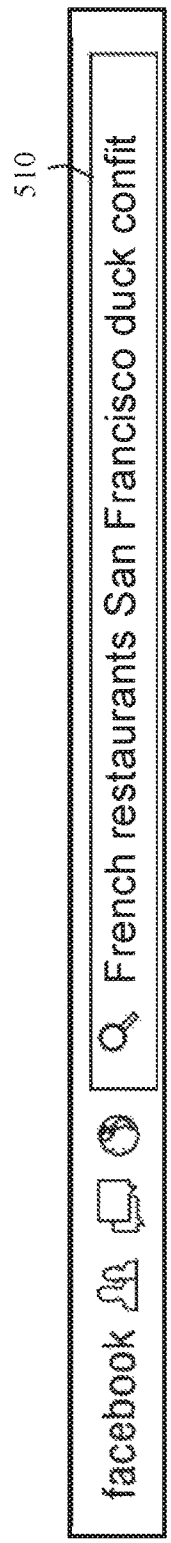
FIG. 5 illustrates an example query inputted into an example search bar of an example web interface.

FIG. 5 illustrates an example query 510 inputted into an example search bar of an example web interface. In particular embodiments, the social-networking system 160 may receive, from a client system of a querying user, a query inputted by the querying user. The query may comprise one or more n-grams, as discussed above. As an example and not by way of limitation, referencing FIG. 5, the querying user has inputted the query "French restaurants San Francisco duck confit." The query 510 may be segmented into a set of n-grams to generate a reconstructed embedding of the query 510. As an example and not by way of limitation, query 510 may be segmented into the set of sequential unigrams <"French", "restaurants", "San", "Francisco", "duck", "confit">. As an another example and not by way of limitation, query 510 may be segmented into the set of sequential bigrams <"French restaurants", "restaurants San", "San Francisco", "Francisco duck", "duck confit">. As another example and not by way of limitation, query 510 may be segmented into the set of n-grams <"French restaurants", "San Francisco", "duck confit">. As another example and not by way of limitation, query 510 may be segmented into the set of 1-skip-2-grams <"French San", "restaurants Francisco", "San duck", "Francisco confit">. Although this disclosure describes receiving and parsing particular queries in a particular manner, this disclosure contemplates receiving and parsing any suitable queries in any suitable manner.

In particular embodiments, the social-networking system 160 may identify one or more objects matching the query, as discussed above. As an example and not by way of limitation, referencing FIG. 5, in response to the query "French restaurants San Francisco duck confit," the social-networking system 160 may identify an object corresponding to a user node associated with the restaurant L'ardoise Bistro, a French restaurant located in San Francisco that serves duck confit, based on matching the n-grams of the search query to n-grams of the user node. Objects may be identified based on having a topic related to the topic of the query As another example and not by way of limitation, for a search query related to the television show GAME OF THRONES (e.g., "Tyrion Lannister actor"), the social-networking system 160 may identify an object associated with a related topic (e.g., an article about David Benioff, the show runner of GAME OF THRONES). The social-networking system 160 may utilize a topic tagger to identify topics associated with identified objects, as disclosed in U.S. patent application Ser. No. 14/470,583, filed 27 Aug. 2014, which is incorporated herein by reference. Although this disclosure describes identifying particular objects in a particular manner, this disclosure contemplates identifying any suitable objects in any suitable manner.

In particular embodiments, the social-networking system 160 may generate a reconstructed embedding of a query based on one or more term embeddings associated with one or more of n-grams of the query, respectively, wherein each of the one or more term embeddings corresponds to a point in a d-dimensional embedding space. A function $\bar{\Pi}$ may map an input to a reconstructed embedding of the input in an embedding space. In particular embodiments, the reconstructed embedding of the query may be generated by pooling the one or more term embeddings associated with the one or more of the n-grams of the query, respectively. As an example and not by way of limitation, for a query q comprising n-grams $t_1$ through $t_n$, $\bar{\Pi}(q)$ may be a pooling of the term embeddings for $t_1$ through $t_n$. In particular embodiments, the pooling may comprise one or more of a sum pooling, an average pooling, a weighted pooling, a pooling with temporal decay, a maximum pooling, or any other suitable pooling. As an example and not by way of limitation, the pooling may be a sum pooling, such that $\bar{\Pi}(q) = \sum_{i=1}^{n} \vec{\pi}(t_i)$. Referencing FIG. 5, query 510 may be the query q="French restaurants San Francisco duck confit", which may be segmented into the set of sequential unigrams <"French", "restaurants", "San", "Francisco", "duck", "confit">, and $\bar{\Pi}(q)$ may be calculated as $\bar{\Pi}(q)=\vec{\pi}$ ("French")+$\vec{\pi}$ ("restaurants")+$\vec{\pi}$ ("San")+$\vec{\pi}$ ("Francisco")+$\vec{\pi}$ ("duck")+$\vec{\pi}$ ("confit"). As another example and not by way of limitation, the pooling may be an average pooling, such that $$\bar{\Pi}(q) = \frac{1}{n}\sum_{i=1}^{n} \vec{\pi}(t_i).$$

Referencing FIG. 5, query 510 may be the query q="French restaurants San Francisco duck confit", which may be segmented into the set of n-grams <"French restaurants", "San Francisco", "duck confit">, and $\bar{\Pi}(q)$ may be calculated as $\bar{\Pi}(q)=\frac{1}{3}[\vec{\pi}$ ("French restaurants")+$\vec{\pi}$ ("San Francisco")+$\vec{\pi}$ ("duck confit")]. In particular embodiments, the term embeddings associated with one or more of the n-grams of the query may be determined based on a deep-learning model. Although this disclosure describes generating a reconstructed embedding of a query in a particular manner, this disclosure contemplates generating a reconstructed embedding of a query in any suitable manner.

In particular embodiments, the social-networking system 160 may calculate, for each identified object, a relevance-score based on a similarity metric of the reconstructed embedding of the query and an object embedding associated with the identified object, wherein the object embedding may correspond to a point in the d-dimensional embedding space. In particular embodiments, the similarity metric may comprise a cosine similarity. As an example and not by way of limitation, a similarity metric of the reconstructed embedding of the query $\bar{\Pi}(q)$ and an object embedding $\vec{\pi}(e_i)$ associated with the identified object may be calculated as the cosine similarity $$\frac{\bar{\Pi}(q) \cdot \vec{\pi}(e_i)}{\|\bar{\Pi}(q)\|\|\vec{\pi}(e_i)\|}.$$

Referencing FIG. 5, query 510 maybe the query q="French restaurants San Francisco duck confit" and identified object $e_i$ may be an article listing the top 10 French restaurants in San Francisco that serve duck confit. The cosine similarity may range from 0 to 1, and $$\frac{\bar{\Pi}(q) \cdot \vec{\pi}(e_i)}{\|\bar{\Pi}(q)\|\|\vec{\pi}(e_i)\|}$$

may be 0.94, which may indicate that the query and the article have a high degree of similarity. Although this disclosure describes calculating a relevance-score in a particular manner, this disclosure contemplates calculating a relevance-score in any suitable manner.

In particular embodiments, the social-networking system 160 may generate one or more search results based on the calculated relevance-scores. Each search result may correspond to one of the identified objects matching the query. In particular embodiments, at least one of the search results may correspond to an identified object with the highest relevance-score. As an example and not by way of limitation, referencing FIG. 5, query 510 maybe the query q="French restaurants San Francisco duck confit", an article listing the top 10 French restaurants in San Francisco that serve duck confit may be an identified object with the highest relevance-score, and based on the relevance-score of the article, a search result corresponding to the article may be generated. In particular embodiments, the relevance-score of an identified object may be used to determine whether a corresponding search result is generated. As an example and not by way of limitation, search results corresponding to identified objects above a threshold relevance-score may be generated. As another example and not by way of limitation, a relevance-score of an identified object may be one of several factors used to determine whether a search result corresponding to the identified object is generated. Although this disclosure describes generating search results in a particular manner, this disclosure contemplates generating search results in any suitable manner.

In particular embodiments, the social-networking system 160 may send, to the client system 130 in response to the query, a search-results interface for display. The search-results interface may comprise one or more of the search results. Each search result may comprise a reference to its corresponding identified object. As an example and not by way of limitation, the search results may be sent to the querying user in the form of a list of links on a search-results webpage, where each link is associated with a different webpage that contains some or all of the identified resources or content. As another example and not by way of limitation, client device 130 may be a mobile device and the search results may be sent to the querying user in the form of a list of links via a software application on the mobile device. Each link in the search results may be an internal link, an external link, a hard link, a filename, or any suitable link. In particular embodiments, each link in the search results may be in the form of a Uniform Resource Locator (URL) that specifies where the corresponding webpage is located and the mechanism for retrieving it. The social-networking system 160 may then send the search-results interface to the web browser 132 on the querying user's client system 130. The querying user may then click on the links or otherwise select the content from the search-results interface to access the content from the social-networking system 160 or from an external system (such as, for example, third-party system 170), as appropriate. In particular embodiments, each search result may include a link to a profile interface and a description or summary of the profile interface (or the node corresponding to that profile interface). When generating the search results, the social-networking system 160 may generate and send to the querying user one or more snippets for each search result, where the snippets may include contextual information about the target of the search result (i.e., contextual information about the social-graph entity, profile interface, or other content corresponding to the particular search result). Although this disclosure describes sending a search-results interface in a particular manner, this disclosure contemplates sending a search-results interface in any suitable manner.

In particular embodiments, the social-networking system 160 may determine one or more objects interacted with by the querying user. A user may interact with an object by posting, modifying, viewing, liking, commenting on, sharing, or otherwise interacting in any way with an object. In particular embodiments, a user interaction may be represented in a social graph 200 by an edge 206 between a node representing the objects and a user node 202 representing the querying user. Although this disclosure describes determining objects that a user has interacted with in a particular manner, this disclosure contemplates determining objects that a user has interacted with in any suitable manner.

In particular embodiments, the social-networking system 160 may generate a reconstructed embedding of the querying user based on one or more object embeddings associated with the one or more objects interacted with by the querying user, respectively. In particular embodiments, a reconstructed embedding of the querying user may be generated by pooling the embeddings of the one or more objects interacted with by the querying user. As an example and not by way of limitation, for a querying user $p_q$ and objects that the querying user has interacted with $e_1$ through $e_n$, the reconstructed embedding of $p_q$ may be the sum pooling $\vec{\Pi}(p_q)=\Sigma_{i=1}^{n}\vec{\pi}(e_i)$, where $\vec{\pi}(e_i)$ is the embedding of object $e_i$. As another example and not by way of limitation, the reconstructed embedding of $p_q$ may be the sum pooling with temporal decay $\vec{\Pi}(p_q)=\Sigma_{i=1}^{n}a(e_i)\vec{\pi}(e_i)$. The function $a(e_i)$ may be a temporal decay function, such as Gaussian decay, linear decay, exponential decay, or any other suitable temporal decay function. The function $a(e_i)$ may be a weighting function that assigns a higher weight to an object $e_i$ the more recently the querying user has interacted with $e_i$. Although this disclosure describes generating a reconstructed embedding of a user in a particular manner, this disclosure contemplates generating a reconstructed embedding of a user in any suitable manner.

In particular embodiments, generating a reconstructed embedding of the querying user may comprise pooling one or more object embeddings associated with one or more objects interacted with by the querying user within a particular timeframe, respectively. As an example and not by way of limitation, a reconstructed embedding of a querying user may be generated based on objects which the querying user has interacted with within the past 30 days. In particular embodiments, generating a reconstructed embedding of the querying user may comprise pooling the one or more object embeddings, wherein the one or more object embeddings are associated with a particular number of the one or more objects interacted most recently with by the querying user, respectively. As an example and not by way of limitation, a reconstructed embedding of a querying user may be generated based on the most recent 128 objects which the querying user has interacted with. Although this disclosure describes generating a reconstructed embedding of a user in a particular manner, this disclosure contemplates generating a reconstructed embedding of a user in any suitable manner.

In particular embodiments, the social-networking system 160 may calculate, for each identified object, a personalization-score based on a similarity metric of the reconstructed embedding of the querying user and an object embedding associated with the identified object. As an example and not by way of limitation, a personalization-score may be based on a similarity metric of the reconstructed embedding of the querying user $\bar{\Pi}(p_q)$ and an object embedding $\bar{\pi}(e_i)$ associated with the identified object calculated as the cosine similarity $$\frac{\Pi(p_q) \cdot \bar{\pi}(e_i)}{\|\Pi(p_q)\| \|\bar{\pi}(e_i)\|}.$$

Although this disclosure describes calculating a personalization-score in a particular manner, this disclosure contemplates calculating a personalization-score in any suitable manner.

In particular embodiments, the social-networking system 160 may generate one or more search results based on the calculated personalization-scores. Each search result may correspond to one of the identified objects matching the query. As an example and not by way of limitation, at least one of the search results may correspond to an identified object with the highest personalization-score. As another example and not by way of limitation, the personalization-score of an identified object may be used to determine whether a corresponding search result is generated. Although this disclosure describes generating search results in a particular manner, this disclosure contemplates generating search results in any suitable manner.

In particular embodiments, the social-networking system 160 may generate a reconstructed embedding of a search context for a current search session of the querying user. The reconstructed embedding of the search context may be based on the reconstructed embedding of the query and the reconstructed embedding of the querying user. The query inputted by the querying user is inputted during the current search session. As an example and not by way of limitation, for a search context c of for a search session of querying user $p_q$ who inputted query q, the reconstructed embedding of the querying user's search context may be the sum pooling $\bar{\Pi}(c) = \bar{\Pi}(p_q) + \bar{\Pi}(q)$. Referencing FIG. 5, query 510 may be the query q="French restaurants San Francisco duck confit" and the querying user may be Steven. If the reconstructed embedding of the querying user is an average pooling of objects Steven has interacted with $e_1$ through $e_4$ and if the reconstructed embedding of the search query is an average pooling of the n-grams <"French restaurants", "San Francisco", "duck confit">, then the reconstructed embedding of Steven's current search context may be $$\Pi(c) = \frac{1}{4}[\bar{\pi}(e_1) + \bar{\pi}(e_2) + \bar{\pi}(e_3) + \bar{\pi}(e_4)] + \frac{1}{3}[\bar{\pi}(\text{"French restaurants"}) + \bar{\pi}(\text{"San Francisco"}) + \bar{\pi}(\text{"duck confit"})].$$

As another example and not by way of limitation, the reconstructed embedding of the querying user's search context may be the average pooling $$\Pi(c) = \frac{\Pi(p_q) + \Pi(q)}{2}.$$

Although this disclosure describes generating a reconstructed embedding of a search context in a particular manner, this disclosure contemplates generating a reconstructed embedding of a search context in any suitable manner.

In particular embodiments, a search session of a querying user may be a particular timeframe during which the querying user is interacting with a web interface by inputting at least one query. As an example and not by way of limitation, a search session may begin when a querying user selects a portion of a web interface that allows the querying user to input a search query (e.g., a search bar) when not engaged in a search session and end upon a period of inactivity that exceeds a threshold duration. As another example and not by way of limitation, a search session may begin when a querying user inputs an initial query and end when the querying user inputs a subsequent query that is sufficiently different from the initial query (e.g., common terms in the initial and subsequent queries may be compared, an embedding for each of the initial and subsequent query may be compared, etc.). Referencing FIG. 5, the search session may begin when the querying user inputs the query "French restaurants San Francisco duck confit" and end when the user inputs a sufficiently dissimilar query (e.g., "city for 2020 Olympic games"). Although this disclosure describes determining a current search session of a user in a particular manner, this disclosure contemplates determining a current search session of a user in any suitable manner.

In particular embodiments, the social-networking system 160 may calculate, for each identified object, a context-score based on a similarity metric of the reconstructed embedding of the search context and the object embedding associated with the identified object. As an example and not by way of limitation, a similarity metric of the reconstructed embedding of the search context $\bar{\Pi}(c)$ and an object embedding $\bar{\pi}(e_i)$ associated with the identified object may be calculated as the cosine similarity $$\frac{\Pi(c) \cdot \bar{\pi}(e_i)}{\|\bar{\Pi}(c)\| \|\bar{\pi}(e_i)\|}.$$

Although this disclosure describes calculating a context-score in a particular manner, this disclosure contemplates calculating a context-score in any suitable manner.

In particular embodiments, the social-networking system 160 may generate one or more search results based on the calculated context-scores. Each search result may correspond to one of the identified objects matching the query. As an example and not by way of limitation, at least one of the search results may correspond to an identified object with the highest context-score. As another example and not by way of limitation, the context-score of an identified object may be used to determine whether a corresponding search result is generated. Although this disclosure describes generating search results in a particular manner, this disclosure contemplates generating search results in any suitable manner.

In particular embodiments, the social-networking system 160 may receive, from the client system of the querying user, an updated query inputted by the querying user during the current search session. In particular embodiments, the social-networking system 160 may update the reconstructed embedding of the query based on one or more term embeddings associated with one or more of the n-grams of the updated query, respectively. As an example and not by way of limitation, for a the reconstructed embedding of the query $\bar{\Pi}(q)$, the querying user may input the updated query q', which may comprise n-grams. For such an updated query, the updated embedding of the query, $\bar{\Pi}(q')$, may be calculated by adding to $\bar{\Pi}(q)$ the term embeddings for each n-gram of q' that is not an n-gram of q, and subtracting from $\bar{\Pi}(q)$ the term embeddings for each n-gram of q that is not an n-gram of q'. As another example and not by way of limitation, the updated embedding of the query, $\bar{\Pi}(q')$ may be calculated as a pooling of the term embeddings of the n-grams of q'. Referencing FIG. 5, the querying user may have input the search query 510 "French restaurants San Francisco duck confit" and may then input the updated query "Best restaurants duck confit bay area". For this query, $\bar{\Pi}(q)$ may be calculated as $\bar{\Pi}(q')=\bar{\Pi}(q)+\vec{\pi}$("Best")+$\vec{\pi}$("bay")+$\vec{\pi}$("area")−$\vec{\pi}$("French")−$\vec{\pi}$("San")−$\vec{\pi}$("Francisco"), or as the sum pooling of the unigrams of the updated query $\bar{\Pi}(q')=\vec{\pi}$("Best")+$\vec{\pi}$("restaurants")+$\vec{\pi}$("duck")+$\vec{\pi}$("confit")+$\vec{\pi}$("bay")+$\vec{\pi}$("area"). Although this disclosure describes receiving an updated query and updating the reconstructed embedding of the query in a particular manner, this disclosure contemplates receiving an updated query and updating the reconstructed embedding of the query in any suitable manner.

In particular embodiments, the social-networking system 160 may update the reconstructed embedding of the search context for the current search session of the querying user based on the updated reconstructed embedding of the query. As an example and not by way of limitation, if the reconstructed embedding of the querying user's search context is the sum pooling $\bar{\Pi}(c)=\bar{\Pi}(p_q)+\bar{\Pi}(q)$, the updated reconstructed embedding of the querying user's search context, $\bar{\Pi}(c')$ may be calculated as $\bar{\Pi}(c')=\bar{\Pi}(p_q)+\bar{\Pi}(q')$. Although this disclosure describes updating the reconstructed embedding of the search context based on the updated reconstructed embedding of the query in a particular manner, this disclosure contemplates updating the reconstructed embedding of the search context based on the updated reconstructed embedding of the query in any suitable manner.

In particular embodiments, the social-networking system 160 may calculate, for each identified object, an updated context-score based on a similarity metric of the updated reconstructed embedding of the search context and the object embedding associated with the identified object. As an example and not by way of limitation, a similarity metric of the updated reconstructed embedding of the search context $\bar{\Pi}(c')$ and an object embedding $\vec{\pi}(e_i)$ associated with the identified object $e_i$ may be calculated as the cosine similarity $$\frac{\Pi(c') \cdot \vec{\pi}(e_i)}{\|\Pi(c')\| \|\vec{\pi}(e_i)\|}.$$

Although this disclosure describes calculating an updated context-score in a particular manner, this disclosure contemplates calculating an updated context-score in any suitable manner.

In particular embodiments, the social-networking system 160 may generate one or more search results based on the calculated updated context-scores. Each search result may correspond to one of the identified objects matching the query. As an example and not by way of limitation, at least one of the search results may correspond to an identified object with the highest updated context-score. As another example and not by way of limitation, the updated context-score of an identified object may be used to determine whether a corresponding search result is generated. Although this disclosure describes generating search results in a particular manner, this disclosure contemplates generating search results in any suitable manner.

In particular embodiments, the social-networking system 160 may receive an indication of an interaction with a search result of the one or more search results by the querying user. A user may interact with a search result by viewing, liking, commenting on, sharing, or otherwise interacting in any way with a search result. Although this disclosure describes receiving an indication of an interaction with a search result by the user in a particular manner, this disclosure contemplates receiving an indication of an interaction with a search result by the user in any suitable manner.

In particular embodiments, the social-networking system 160 may update the reconstructed embedding of the search context for the current search session of the querying user based on the embedding of the identified object referenced by the search result interacted with by the querying user. As an example and not by way of limitation, the updated embedding of the querying user's search context $\bar{\Pi}(c')$ may be a pooling of the original reconstructed embedding of the search context $\bar{\Pi}(c)$ and the embedding $\vec{\pi}(e_j)$ of the identified object $e_j$ referenced by the search result interacted with by the querying user. Although this disclosure describes updating the reconstructed embedding of the search context based on a user interaction in a particular manner, this disclosure contemplates updating the reconstructed embedding of the search context based on a user interaction in any suitable manner.

In particular embodiments, if the interaction with the search result by the querying user is a positive interaction, then the updated reconstructed embedding of the search context may comprises a sum of the reconstructed embedding of the search context and the embedding of the identified object referenced by the search result interacted with by the querying user. As an example and not by way of limitation, the updated embedding of the querying user's search context $\bar{\Pi}(c')$ may be calculated as $\bar{\Pi}(c')=\bar{\Pi}(c)+\vec{\pi}(e_p)$, where $e_p$ may be the object referenced by the search result with which the querying user had a positive interaction. A positive interaction may be an indication that the search result is relevant to the querying user. As an example and not by way of limitation, an interaction may be determined to be a positive interaction if the querying user interacts with the search result for at least a threshold duration of time. A threshold duration of time may be a pre-determined duration, based on the querying user's typical interactions with search results historically, based on the duration that other users typically interact with the search result, or determined in any suitable manner. As another example and not by way of limitation, the an interaction may be determined to be a positive interaction if the search result is the last search result the querying user interacted with prior to the end of the current search session. Although this disclosure describes updating the reconstructed embedding of the search context based on a positive user interaction in a particular manner, this disclosure contemplates updating the reconstructed embedding of the search context based on a positive user interaction in any suitable manner.

In particular embodiments, if the interaction with the search result by the querying user is a negative interaction, then the updated reconstructed embedding of the search context may comprises a difference between the reconstructed embedding of the search context and the embedding of the identified object referenced by the search result interacted with by the querying user. As an example and not by way of limitation, the updated embedding of the querying user's search context $\bar{\Pi}(c')$ may be calculated as $\bar{\Pi}(c')=$ $\bar{\Pi}(c) - \bar{\pi}(e_n)$, where $e_n$ may be the object referenced by the search result with which the querying user had a negative interaction. A negative interaction may be an indication that the search result is not relevant to the querying user. As an example and not by way of limitation, an interaction may be determined to be a negative interaction if the querying user interacts with the search result for less than a threshold duration of time. A threshold duration of time may be a pre-determined duration, based on the querying user's typical interactions with search results historically, based on the duration that other users typically interact with the search result, or determined in any suitable manner. As another example and not by way of limitation, an interaction may be determined to be a negative interaction if the querying user interacts with a threshold number of subsequent search results during the current search session. As another example and not by way of limitation, the interaction may be determined to be a negative interaction if the querying user inputs an updated search query during the current search session and subsequent to the interaction. Although this disclosure describes updating the reconstructed embedding of the search context based on a negative user interaction in a particular manner, this disclosure contemplates updating the reconstructed embedding of the search context based on a negative user interaction in any suitable manner.

In particular embodiments, the social-networking system 160 may calculate, for each identified object, an updated context-score based on a similarity metric of the updated reconstructed embedding of the search context and the object embedding associated with the identified object. In particular embodiments, the social-networking system 160 may generate one or more search results based on the calculated updated context-scores. Each search result may correspond to one of the identified objects matching the query. Although this disclosure describes calculating an updated context-score and generating search results in a particular manner, this disclosure contemplates calculating an updated context-score and generating search results in any suitable manner.

In particular embodiments, the search-results interface may further comprise a recommendation referencing an object, and wherein the recommendation may be selected based on a similarity metric of an embedding of the object referenced by the recommendation and the reconstructed embedding of the search context for the current search session of the querying user. As an example and not by way of limitation, a recommendation referencing an object $e_r$ may be included in a search-results interface based on a cosine similarity $$\frac{\bar{\Pi}(c) \cdot \bar{\pi}(e_r)}{\|\bar{\Pi}(c)\| \|\bar{\pi}(e_r)\|}$$

indicating that $e_r$ and c are relatively similar. An object referenced by a recommendation may or may not be either an identified object or an object reference by a search result. Although this disclosure describes providing a recommendation referencing an object in a particular manner, this disclosure contemplates a recommendation referencing an object in any suitable manner.

In particular embodiments, at least one identified object may correspond to a second user, and wherein the object embedding associated with the identified object corresponding to the second user may be a reconstructed embedding generated based on one or more objects associated with the second user. The second user may be a different user than the querying user. As an example and not by way of limitation, in response to receiving a query inputted by a querying user $p_q$, the social-networking system 160 may identify one or more objects that includes object $e_o$ corresponding to a second user $p_o$. The embedding $\bar{\pi}(e_o)$ may be calculated based on one or more objects interacted with by the second user $p_0$. For example, if the second user $p_0$ has interacted with objects $e_1'$ through $e_n'$, then the embedding $\bar{\pi}(e_0)$ may be calculated as a sum pooling such that $\bar{\pi}(e_0) = \bar{\Pi}(p_0) = \Sigma_{i=1}^{n} \bar{\pi}(e_i')$, where $\bar{\pi}(e_i')$ is the embedding of object $e_i'$. Although this disclosure describes generating an embedding for an object corresponding to a user in a particular manner, this disclosure contemplates generating an embedding for an object corresponding to a user in any suitable manner.

In particular embodiments the object embedding associated with an identified object may be based on one or more n-grams associated with the object. As an example and not by way of limitation, an identified object $e_0$ may comprise n-grams $t_1'$ through $t_n'$. An embedding $\bar{\pi}(e_0)$ may be generated as a sum pooling the embeddings of n-grams $t_1'$ through $t_n'$, such that $\bar{\pi}(e_0) = \bar{\Pi}(e_0) = \Sigma_{i=1}^{n} \bar{\pi}(t_i')$. Although this disclosure describes generating an embedding for an object comprising n-grams in a particular manner, this disclosure contemplates generating an embedding for an object comprising n-grams in any suitable manner.

In particular embodiments, the social-networking system 160 may rank each search result based on an output of a gradient-boosted decision tree. As an example and not by way of limitation, an object may be ranked based on a relevance function using parameters selected by a gradient boosting algorithm to minimize total error. As another example and not by way of limitation, a gradient boosting algorithm, such as GradientBoost, may be used to rank an object. An object's rank may be based on its relevance-score, its personalization-score, its context-score, any other information about the object, or any combination thereof. In particular embodiments, the search results may be displayed in the search-results interface based on their rankings. As an example and not by way of limitation, search results may be presented in a rank-order list. Although this disclosure describes ranking based on gradient-boosted decision tree in a particular manner, this disclosure contemplates ranking based on gradient-boosted decision tree in any suitable manner.

Figure 6:
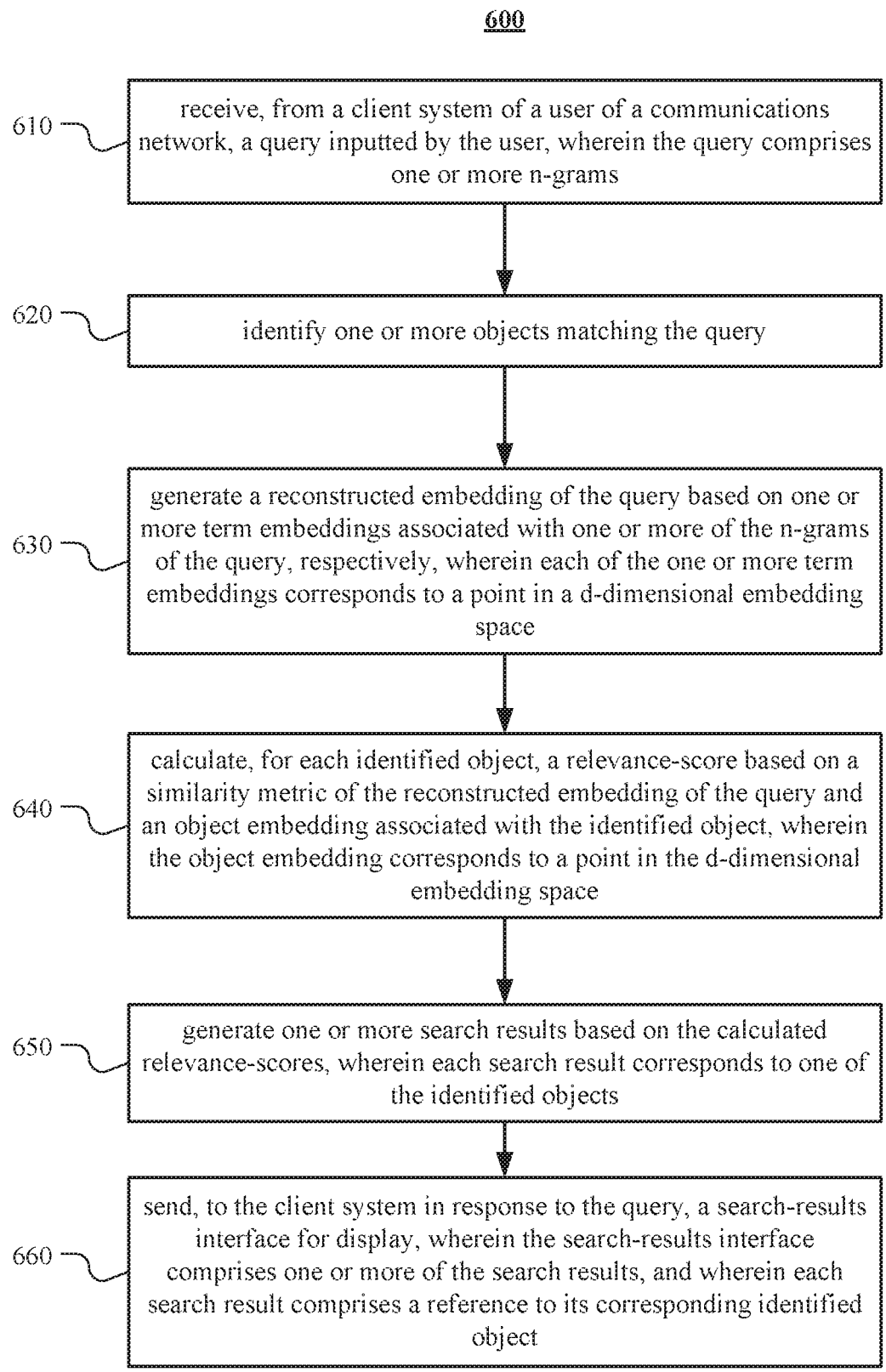
FIG. 6 illustrates an example method for generating search results based on relevance-scores.

FIG. 6 illustrates an example method 600 for generating search results based on relevance-scores. The method may begin at step 610, where the social-networking system 160 may receive, from a client system of a user of a communications network, a query inputted by the user, wherein the query comprises one or more n-grams. At step 620, the social-networking system 160 may identify one or more objects matching the query. At step 630, the social-networking system 160 may generate a reconstructed embedding of the query based on one or more term embeddings associated with one or more of the n-grams of the query, respectively, wherein each of the one or more term embeddings corresponds to a point in a d-dimensional embedding space. At step 640, the social-networking system 160 may generate a reconstructed embedding of the query based on one or more term embeddings associated with one or more of the n-grams of the query, respectively, wherein each of the one or more term embeddings corresponds to a point in a d-dimensional embedding space. At step 650, the social-networking system 160 may generate a reconstructed embedding of the query based on one or more term embeddings associated with one or more of the n-grams of the query, respectively, wherein each of the one or more term embeddings corresponds to a point in a d-dimensional embedding space. At step 660, the social-networking system 160 may send, to the client system in response to the query, a search-results interface for display, wherein the search-results interface comprises one or more of the search results, and wherein each search result comprises a reference to its corresponding identified object. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating search results based on relevance-scores including the particular steps of the method of FIG. 6, this disclosure contemplates any suitable method for generating search results based on relevance-scores including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
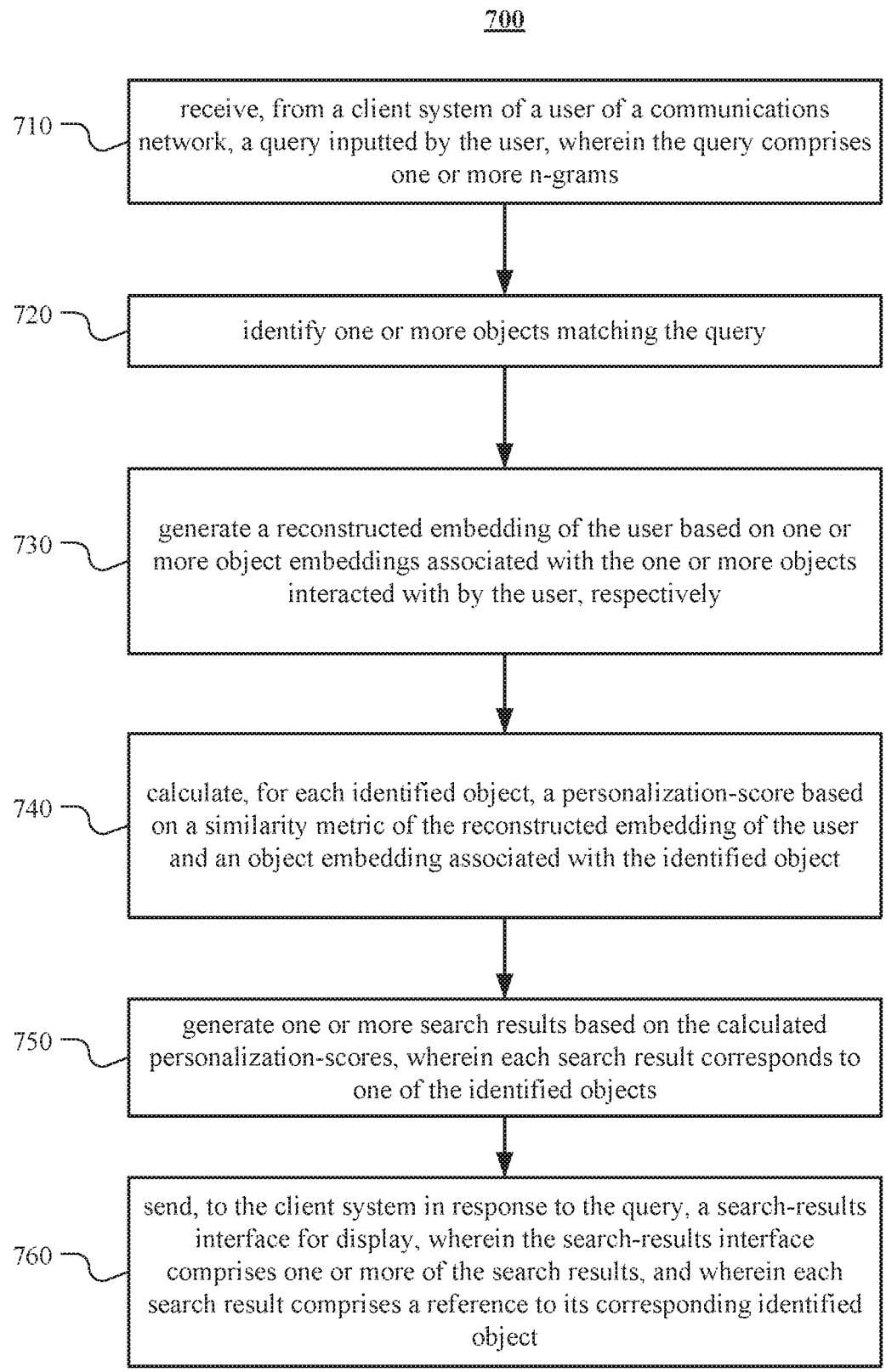
FIG. 7 illustrates an example method for generating search results based on personalization-scores.

FIG. 7 illustrates an example method 700 for generating search results based on personalization-scores. The method may begin at step 710, where the social-networking system 160 may receive, from a client system of a user of a communications network, a query inputted by the user, wherein the query comprises one or more n-grams. At step 720, the social-networking system 160 may identify one or more objects matching the query. At step 730, the social-networking system 160 may generate a reconstructed embedding of the user based on one or more object embeddings associated with the one or more objects interacted with by the user, respectively. At step 740, the social-networking system 160 may calculate, for each identified object, a personalization-score based on a similarity metric of the reconstructed embedding of the user and an object embedding associated with the identified object. At step 750, the social-networking system 160 may generate one or more search results based on the calculated personalization-scores, wherein each search result corresponds to one of the identified objects. At step 760, the social-networking system 160 may send, to the client system in response to the query, a search-results interface for display, wherein the search-results interface comprises one or more of the search results, and wherein each search result comprises a reference to its corresponding identified object. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating search results based on personalization-scores including the particular steps of the method of FIG. 7, this disclosure contemplates any suitable method for generating search results based on personalization-scores including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
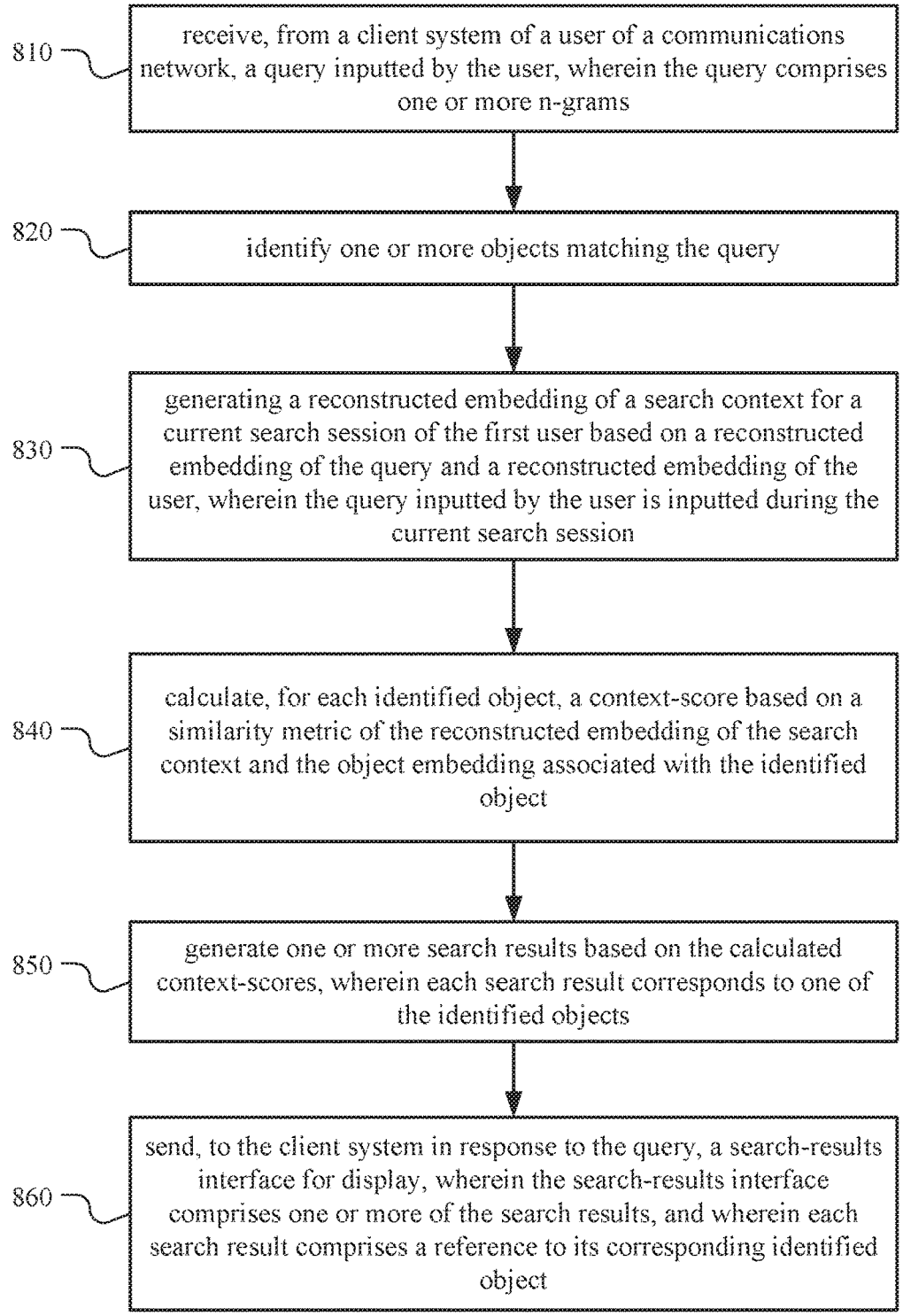
FIG. 8 illustrates an example method for generating search results based on context-scores.

FIG. 8 illustrates an example method 800 for generating search results based on context-scores. The method may begin at step 810, where the social-networking system 160 may receive, from a client system of a user of a communications network, a query inputted by the user, wherein the query comprises one or more n-grams. At step 820, the social-networking system 160 may identify one or more objects matching the query. At step 830, the social-networking system 160 may generating a reconstructed embedding of a search context for a current search session of the first user based on a reconstructed embedding of the query and a reconstructed embedding of the user, wherein the query inputted by the user is inputted during the current search session. At step 840, the social-networking system 160 may calculate, for each identified object, a context-score based on a similarity metric of the reconstructed embedding of the search context and the object embedding associated with the identified object. At step 850, the social-networking system 160 may generate one or more search results based on the calculated context-scores, wherein each search result corresponds to one of the identified objects. At step 860, the social-networking system 160 may send, to the client system in response to the query, a search-results interface for display, wherein the search-results interface comprises one or more of the search results, and wherein each search result comprises a reference to its corresponding identified object. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating search results based on context-scores including the particular steps of the method of FIG. 8, this disclosure contemplates any suitable method for generating search results based on context-scores including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
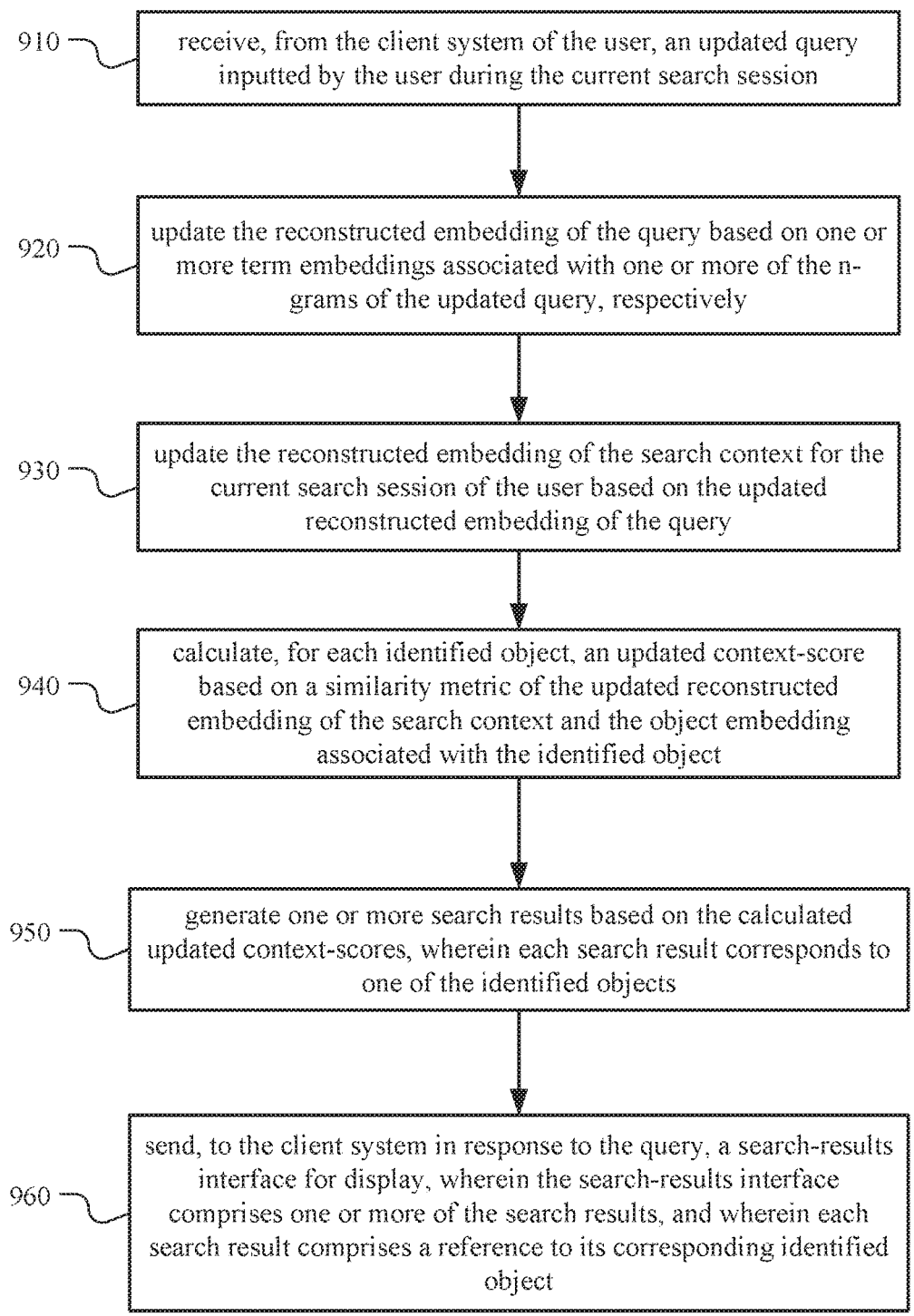
FIG. 9 illustrates an example method for updating context-scores based on an updated query.

FIG. 9 illustrates an example method 900 for updating context-scores based on an updated query. The method may begin at step 910, where the social-networking system 160 may receive, from the client system of the user, an updated query inputted by the user during the current search session. At step 920, the social-networking system 160 may update the reconstructed embedding of the query based on one or more term embeddings associated with one or more of the n-grams of the updated query, respectively. At step 930, the social-networking system 160 may update the reconstructed embedding of the search context for the current search session of the user based on the updated reconstructed embedding of the query. At step 940, the social-networking system 160 may calculate, for each identified object, an updated context-score based on a similarity metric of the updated reconstructed embedding of the search context and the object embedding associated with the identified object. At step 950, the social-networking system 160 may generate one or more search results based on the calculated updated context-scores, wherein each search result corresponds to one of the identified objects. At step 960, the social-networking system 160 may send, to the client system in response to the query, a search-results interface for display, wherein the search-results interface comprises one or more of the search results, and wherein each search result comprises a reference to its corresponding identified object. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for updating context-scores based on an updated query including the particular steps of the method of FIG. 9, this disclosure contemplates any suitable method for updating context-scores based on an updated query including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
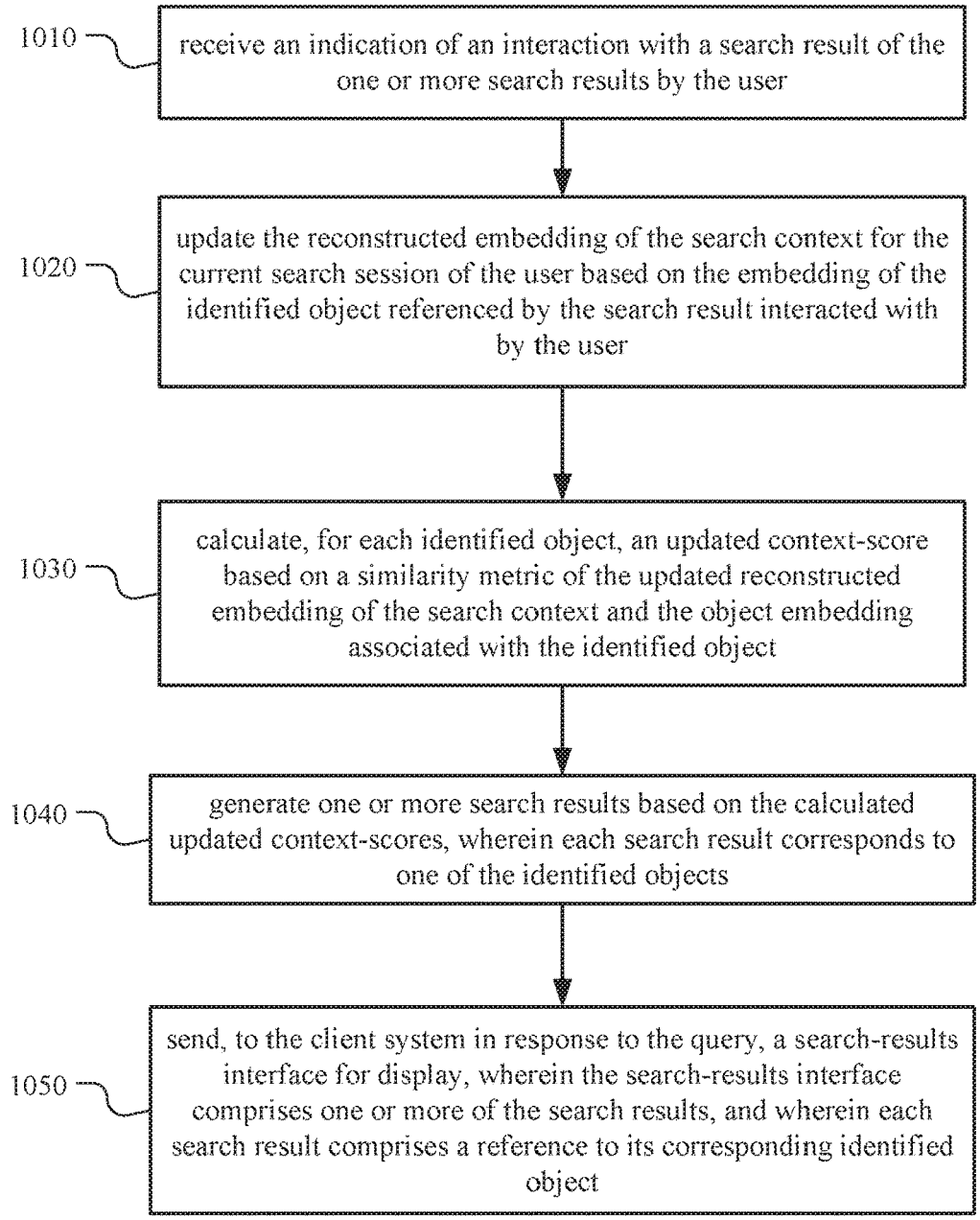
FIG. 10 illustrates an example method for updating context-scores based on a user interaction.

FIG. 10 illustrates an example method 1000 for updating context-scores based on a user interaction. The method may begin at step 1010, where the social-networking system 160 may receive an indication of an interaction with a search result of the one or more search results by the user. At step 1020, the social-networking system 160 may update the reconstructed embedding of the search context for the current search session of the user based on the embedding of the identified object referenced by the search result interacted with by the user. At step 1030, the social-networking system 160 may calculate, for each identified object, an updated context-score based on a similarity metric of the updated reconstructed embedding of the search context and the object embedding associated with the identified object. At step 1040, the social-networking system 160 may generate one or more search results based on the calculated updated context-scores, wherein each search result corresponds to one of the identified objects. At step 1050, the social-networking system 160 may send, to the client system in response to the query, a search-results interface for display, wherein the search-results interface comprises one or more of the search results, and wherein each search result comprises a reference to its corresponding identified object. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for updating context-scores based on a user interaction including the particular steps of the method of FIG. 10, this disclosure contemplates any suitable method for updating context-scores based on a user interaction including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Systems and Methods

Figure 11:
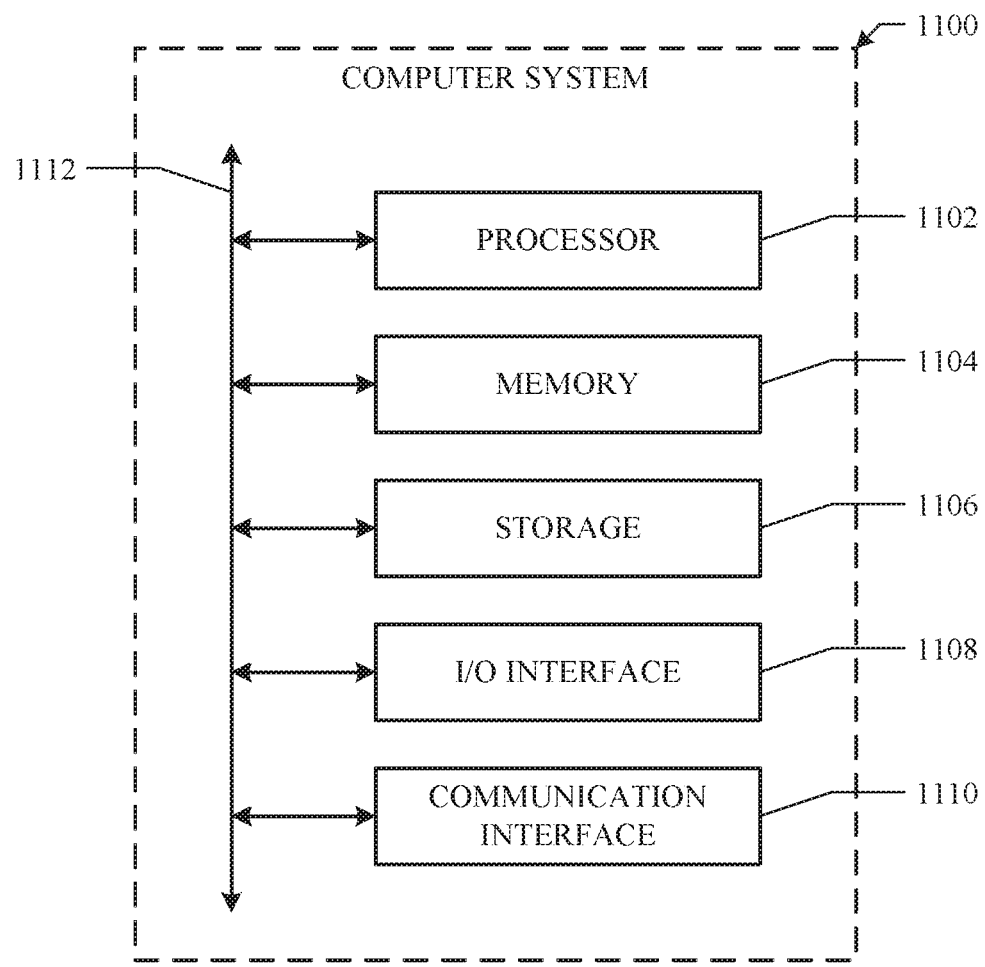
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computer systems:
   receiving, from a client system of a first user of a communications network, a query inputted by the first user, wherein the query comprises one or more n-grams;
   identifying one or more objects matching the query;
   generating a reconstructed embedding of the query based on one or more term embeddings associated with one or more of the n-grams of the query, respectively, wherein each of the one or more term embeddings corresponds to a point in a d-dimensional embedding space, wherein the reconstructed embedding of the query is generated by pooling the one or more term embeddings associated with the one or more of the n-grams of the query, respectively;
   calculating, for each identified object, a relevance-score based on a similarity metric of the reconstructed embedding of the query and an object embedding associated with the identified object, wherein the object embedding corresponds to a point in the d-dimensional embedding space;
   generating one or more search results based on the calculated relevance-scores, wherein each search result corresponds to one of the identified objects; and
   sending, to the client system in response to the query, a search-results interface for display, wherein the search-results interface comprises one or more of the search results, and wherein each search result comprises a reference to its corresponding identified object.

2. The method of claim 1, further comprising:
   determining one or more objects interacted with by the first user;
   generating a reconstructed embedding of the first user based on one or more object embeddings associated with the one or more objects interacted with by the first user, respectively;
   calculating, for each identified object, a personalization-score based on a similarity metric of the reconstructed embedding of the first user and the object embedding associated with the identified object; and
   wherein generating the one or more search results is further based on the calculated personalization-scores.

3. The method of claim 2, wherein generating a reconstructed embedding of the first user comprises pooling the one or more object embeddings, and wherein the one or more object embeddings are associated with one or more objects interacted with by the first user within a particular timeframe, respectively.

4. The method of claim 2, wherein generating a reconstructed embedding of the first user comprises pooling the one or more object embeddings, and wherein the one or more object embeddings are associated with a particular number of the one or more objects interacted most recently with by the first user, respectively.

5. The method of claim 2, further comprising:
generating a reconstructed embedding of a search context for a current search session of the first user based on the reconstructed embedding of the query and the reconstructed embedding of the first user, wherein the query inputted by the first user is inputted during the current search session;
calculating, for each identified object, a context-score based on a similarity metric of the reconstructed embedding of the search context and the object embedding associated with the identified object; and
wherein generating the one or more search results is further based on the calculated context-scores.

6. The method of claim 5, further comprising:
receiving, from the client system of the first user, an updated query inputted by the first user during the current search session;
updating the reconstructed embedding of the query based on one or more term embeddings associated with one or more of the n-grams of the updated query, respectively;
updating the reconstructed embedding of the search context for the current search session of the first user based on the updated reconstructed embedding of the query;
calculating, for each identified object, an updated context-score based on a similarity metric of the updated reconstructed embedding of the search context and the object embedding associated with the identified object; and
wherein generating the one or more search results is further based on the calculated updated context-scores, wherein each search result corresponds to one of the identified objects.

7. The method of claim 5, further comprising:
receiving an indication of an interaction with a search result of the one or more search results by the first user;
updating the reconstructed embedding of the search context for the current search session of the first user based on the embedding of the identified object referenced by the search result interacted with by the first user;
calculating, for each identified object, an updated context-score based on a similarity metric of the updated reconstructed embedding of the search context and the object embedding associated with the identified object; and
wherein generating the one or more search results is further based on the calculated updated context-scores, wherein each search result corresponds to one of the identified objects.

8. The method of claim 7, wherein:
if the interaction with the search result by the first user is a positive interaction, then the updated reconstructed embedding of the search context comprises a sum of the reconstructed embedding of the search context and the embedding of the identified object referenced by the search result interacted with by the first user; and
if the interaction with the search result by the first user is a negative interaction, then the updated reconstructed embedding of the search context comprises a difference between the reconstructed embedding of the search context and the embedding of the identified object referenced by the search result interacted with by the first user.

9. The method of claim 5, wherein the search-results interface further comprises a recommendation referencing an object, and wherein the recommendation is selected based on a similarity metric of an embedding of the object referenced by the recommendation and the reconstructed embedding of the search context for the current search session of the first user.

10. The method of claim 1, wherein the similarity metric comprises a cosine similarity.

11. The method of claim 1, wherein the pooling comprises one or more of a sum pooling, an average pooling, a weighted pooling, a pooling with temporal decay, or a maximum pooling.

12. The method of claim 1, wherein at least one identified object corresponds to a second user, and wherein the object embedding associated with the identified object corresponding to the second user is a reconstructed embedding generated based on one or more objects associated with the second user.

13. The method of claim 1, wherein, for each identified object, the object embedding associated with the identified object is based on one or more n-grams associated with the object.

14. The method of claim 1 further comprising ranking each search result based on an output of a gradient-boosted decision tree, wherein the search results are displayed in the search-results interface based on their rankings.

15. The method of claim 1, wherein the term embeddings associated with one or more of the n-grams of the query are determined based on a deep-learning model.

16. One or more computer-readable non-transitory storage media embodying software that is operable when executed to:
receive, from a client system of a first user of a communications network, a query inputted by the first user, wherein the query comprises one or more n-grams;
identify one or more objects matching the query;
generate a reconstructed embedding of the query based on one or more term embeddings associated with one or more of the n-grams of the query, respectively, wherein each of the one or more term embeddings corresponds to a point in a d-dimensional embedding space, wherein the reconstructed embedding of the query is generated by pooling the one or more term embeddings associated with the one or more of the n-grams of the query, respectively;
calculate, for each identified object, a relevance-score based on a similarity metric of the reconstructed embedding of the query and an object embedding associated with the identified object, wherein the object embedding corresponds to a point in the d-dimensional embedding space;
generate one or more search results based on the calculated relevance-scores, wherein each search result corresponds to one of the identified objects; and
send, to the client system in response to the query, a search-results interface for display, wherein the search-results interface comprises one or more of the search results, and wherein each search result comprises a reference to its corresponding identified object.

17. The media of claim 16, wherein the software is further operable when executed to:
determine one or more objects interacted with by the first user;
generate a reconstructed embedding of the first user based on one or more object embeddings associated with the one or more objects interacted with by the first user, respectively;
calculate, for each identified object, a personalization-score based on a similarity metric of the reconstructed embedding of the first user and the object embedding associated with the identified object; and wherein generating the one or more search results is further based on the calculated personalization-scores.

18. A system comprising: one or more processors; and a non-transitory memory coupled to the processors comprising instructions executable by the processors, the processors operable when executing the instructions to:

receive, from a client system of a first user of a communications network, a query inputted by the first user, wherein the query comprises one or more n-grams;

identify one or more objects matching the query;

generate a reconstructed embedding of the query based on one or more term embeddings associated with one or more of the n-grams of the query, respectively, wherein each of the one or more term embeddings corresponds to a point in a d-dimensional embedding space, wherein the reconstructed embedding of the query is generated by pooling the one or more term embeddings associated with the one or more of the n-grams of the query, respectively;

calculate, for each identified object, a relevance-score based on a similarity metric of the reconstructed embedding of the query and an object embedding associated with the identified object, wherein the object embedding corresponds to a point in the d-dimensional embedding space;

generate one or more search results based on the calculated relevance-scores, wherein each search result corresponds to one of the identified objects; and send, to the client system in response to the query, a search-results interface for display, wherein the search-results interface comprises one or more of the search results, and wherein each search result comprises a reference to its corresponding identified object.

19. The system of claim 18, wherein the processors are further operable when executing the instructions to:

determine one or more objects interacted with by the first user;

generate a reconstructed embedding of the first user based on one or more object embeddings associated with the one or more objects interacted with by the first user, respectively;

calculate, for each identified object, a personalization-score based on a similarity metric of the reconstructed embedding of the first user and the object embedding associated with the identified object; and wherein generating the one or more search results is further based on the calculated personalization-scores.

* * * * *